W. PAVLIK.
TIRE.
APPLICATION FILED SEPT. 22, 1911.
1,017,456.
Patented Feb. 13, 1912.
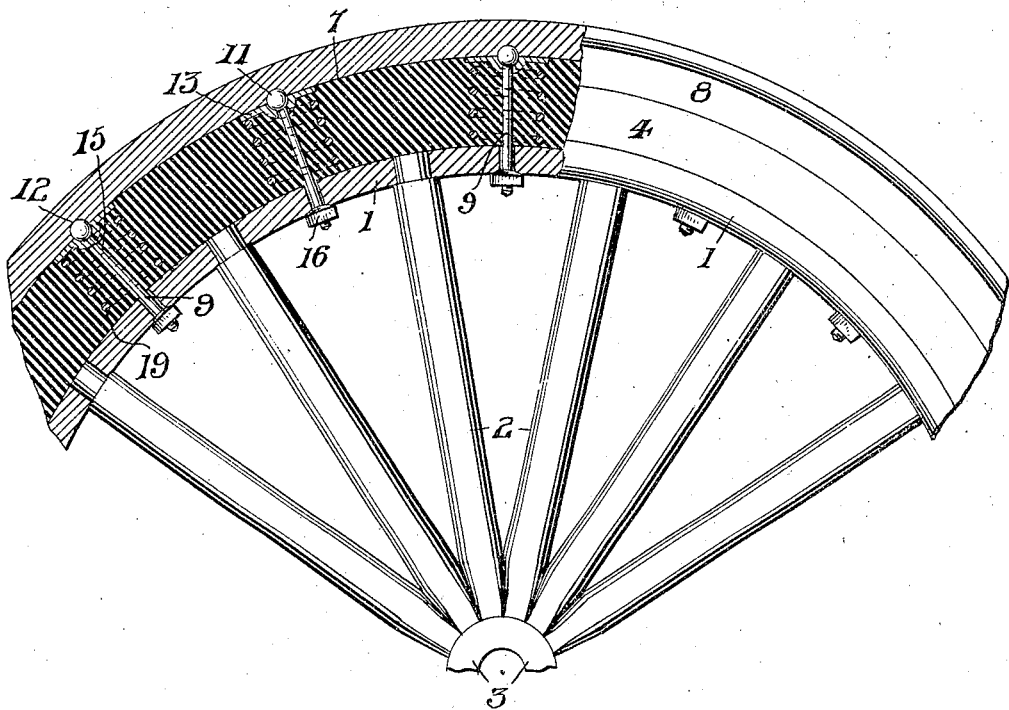
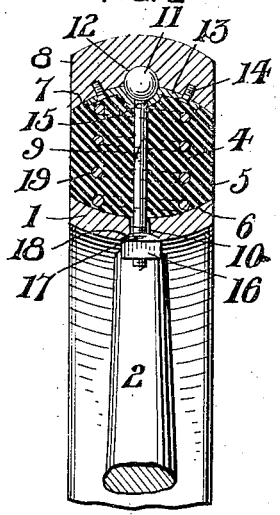
WITNESSES
J. G. Appleman,
Ralph C. Evert.
INVENTOR
William Pavlik
BY
N. C. Evert &co.
ATTORNEYS

UNITED STATES PATENT OFFICE.

WILLIAM PAVLIK, OF BAYPORT, NEW YORK.

TIRE.

1,017,456. Specification of Letters Patent. Patented Feb. 13, 1912.

Application filed September 22, 1911. Serial No. 650,718.

*To all whom it may concern:*

Be it known that I, WILLIAM PAVLIK, a subject of the King of Hungary, residing at Bayport, in the county of Suffolk and State of New York, have invented certain new and useful Improvements in Tires, of which the following is a specification, reference being had therein to the accompanying drawing.

This invention relates to tires for automobile wheels, and the objects of my invention are to obviate the necessity of using an inner pneumatic tube in connection with the tire, and to provide a yieldable tire that is punctureproof, non-skidding, and highly efficient for cushioning a periphery of a wheel.

Other objects of my invention are to combine rubber and springs in such a manner that the rim of the wheel will be firmly cushioned relatively to the felly of a wheel, and to provide a tire consisting of comparatively few parts that are strong and durable and highly efficient for the purposes for which they are intended.

With the above and other objects in view, the invention resides in the novel construction, combination and arrangement of parts to be hereinafter specifically described and then claimed.

Reference will now be had to the drawing, wherein:—

Figure 1 is a side elevation of a portion of a wheel showing the tire thereof partly broken away and partly in section, and Fig. 2 is a cross sectional view of the tire.

The reference numeral 1 denotes a concave felly supported by a plurality of spokes 2 from a hub 3. Mounted upon the felly 1 is a yieldable body 4, preferably made of rubber, said body having flat sides 5, a convex bottom 6 and a convex top 7. The convex bottom 6 seats in the felly 1 and the flat sides of the yieldable body are flush with the edges of said felly. Mounted upon the convex top 7 of the yieldable body 1 is a rim 8 that is convex-concavo, said rim having the side edges thereof flush with the sides of the yieldable body 4. Extending through the body 4 are a plurality of bolts 9, said bolts extending through openings 10 provided therefor in the felly 1, between the spokes 2. The bolts 9 have spherical heads 11 rotatably mounted in sockets 12 provided therefor in the inner side of the rim 8. The bolts 9 are retained in position by metallic socket members 13 connected to the rim 8 by screws 14 or other fastening means. These socket members coöperate with the sockets 12 in revolubly supporting the heads 11 of the bolts 9, said members having openings 15 providing clearance for the bolts. The inner ends of the bolts are provided with nuts 16 and the outer faces of the nuts are rounded or beveled, as at 17 whereby the bolts can readily rotate. The felly 1 is recessed, as at 18 to provide seats for the nuts 16 and it is upon the seats that the nuts 16 revolve with the bolts 9. Embedded within the yieldable body 4 are coiled compression springs 19 corresponding in number to the bolts, said springs encircling the bolts and adding resiliency to the yieldable body 4.

From the foregoing it will be observed that the rim 8 can shift relatively to the felly 1, and that the springs 19 will coöperate with the yieldable body 4 in cushioning the rim relatively to the felly 1. The rim 8 and the felly 1 can be made of metal or any other light and durable material.

What I claim is:—

A tire comprising a concave rim, an annular yieldable block mounted upon said rim, a convexo-concave tire mounted upon said block, socket members carried by the inner side of said tire and abutting against said block, bolts extending through said rim and said block into said socket members, said block snugly engaging said bolts heads carried by said bolts and movably arranged in said socket members, nuts screwed upon the inner ends of said bolts for retaining said bolts in engagement with said rim, and coiled compression spring embedded in said block and encircling said bolts between said socket members and said rim.

In testimony whereof I affix my signature in the presence of two witnesses.

WILLIAM PAVLIK.

Witnesses:
E. J. WOODS,
JOHN R. WOODS.